United States Patent [19]
Marchetti et al.

[11] Patent Number: 6,071,564
[45] Date of Patent: Jun. 6, 2000

[54] COATINGS BASED ON PERFLUOROPOLYETHERS

[75] Inventors: Roberta Marchetti, Voghera; Massimo Malavasi, Milan, both of Italy

[73] Assignee: Ausimont S.p.A., Milan, Italy

[21] Appl. No.: 08/872,454

[22] Filed: Jun. 10, 1997

[30] Foreign Application Priority Data

Jun. 10, 1996 [IT] Italy .................................. MI96A1178

[51] Int. Cl.[7] .............................. B05D 3/02; C08G 18/28
[52] U.S. Cl. ........................... 427/385.5; 528/45; 528/48; 528/59; 528/65; 528/70; 528/76; 528/77; 524/755; 524/768; 524/770; 525/452; 525/453; 525/456; 427/208.2; 427/335; 427/372.2; 427/388.3; 427/487
[58] Field of Search .................................. 528/45, 48, 59, 528/65, 70, 76, 77; 524/755, 768, 770; 525/452, 453, 456; 427/487, 208.2, 335, 372.2, 384.5, 388.3

[56] References Cited

U.S. PATENT DOCUMENTS

| | | | |
|---|---|---|---|
| 2,242,218 | 5/1941 | Auer | 91/70 |
| 3,665,041 | 5/1972 | Sianesi et al. | 260/615 A |
| 3,715,378 | 2/1973 | Sianesi et al. | 260/463 |
| 3,810,874 | 5/1974 | Mitsch et al. | 260/75 |
| 4,704,420 | 11/1987 | Federici et al. | 524/233 |
| 4,758,622 | 7/1988 | Gosselin | 524/716 |
| 4,781,987 | 11/1988 | Bolgiano et al. | 428/424.6 |
| 4,853,097 | 8/1989 | Marchionni et al. | 204/157.6 |
| 4,863,986 | 9/1989 | Re et al. | 524/197 |
| 5,104,911 | 4/1992 | Marchionni et al. | 522/187 |
| 5,426,142 | 6/1995 | Rosano et al. | 524/156 |

FOREIGN PATENT DOCUMENTS

| | | |
|---|---|---|
| 0148482 | 7/1985 | European Pat. Off. . |
| 0239123 | 9/1987 | European Pat. Off. . |
| 0247614 | 12/1987 | European Pat. Off. . |
| 0 665 253 A1 | 8/1995 | European Pat. Off. . |
| 0695772 | 2/1996 | European Pat. Off. . |
| 0 739 923 A2 | 10/1996 | European Pat. Off. . |
| 1309 402 | 3/1973 | United Kingdom . |
| 9006958 | 6/1990 | WIPO . |

OTHER PUBLICATIONS

Italian patent application No. 19779A/86, filed Mar. 17, 1986 (now abandoned).
Italian patent application No. 19780A/86, filed Mar. 17, 1986(now abandoned).
Italian patent application No. MI95A0855, filed Apr. 28, 1995, corresponding to European Application No. EP–A–739 923.

*Primary Examiner*—Samuel A. Acquah
*Attorney, Agent, or Firm*—Nikaido Marmelstein Murray & Oram, LLP

[57] ABSTRACT

Use for protective coatings of compositions comprising (% by wt.): A) from 10 to 60% of a A1) (per)fluoropolyethereal prepolymer having a polyisocyanic functionality obtainable by reacting a bifunctional having hydroxylic functionality, said fluoropolyethers having —$CH_2OH$ terminations directly linked to a perfluoroalkylic group $CF_2$ or $CF_2CFX$ (X=Cl, F) or $CF(CF_3)$, with a polyisocyanate containing isocyanurate rings, preferably obtained by cyclotrimerization of HDI, IPDI or other monomeric diisocyanates, by utilizing an excess of isocyanate groups comprised between 10 and 80% by moles; the above fluoropolyether prepolymer can be partially or totally replaced by A2) non fluorinated polyisocyanates containing isocyanurate rings and/or hydrogenated polyisocyanate prepolymers;

B) from 0.1 to 50% of a (per)fluoropolyether having bifunctional hydroxylic functionality of the type —$CF_2CH_2OH$, —$CF_2CFXCH_2OH$ (X=Cl, F) or —$CF(CF_3)CH_2OH$; or polyfunctional hydroxylic functionality termination but containing at least 5% by weight, preferably 10%, of the same type of termination indicated above for the bifunctional; or (per)fluoropolyethers prepolymers as defined in A) but having a lower prepolymerization degree so to leave free oxydrilyic functions of the type —$CF_2CH_2OH$, —$CF_2CFXCH_2OH$ (X=Cl, F), or —$CF(CF_3)CH_2OH$; or the latter prepolymers having free hydroxilic functions can be used alone as a single component, being component A) 0%;

C) 10–90%, with respect to the resin of a diluting solvent.

31 Claims, 3 Drawing Sheets

COATINGS BASED ON PERFLUOROPOLYETHERS

The present invention relates to compositions based on (per)fluoropolyethers having isocyanic terminals and compositions thereof with various contents of (per) fluoropolyethers having hydroxylic functionality, to be used for the coating and the protection of materials commonly employed in building, infrastructures, cars, wood, protection in general of substratas and coatings versus the dirting, as well as the decay caused by the use of inks, spray or brush paints, colored chalks, i.e. coatings having the following set of combined improved properties: anti-graffiti, durability, solvents resistance, no dirt pick-up, stain release, as specified hereinunder.

The invention includes, to the knowledge of the inventors, the first example of Room Temperature Curing (RTC) coating providing the entire set of improved properties mentioned above.

The invention includes a composition capable of providing the entire set of improved propereties, mentioned above, coupled with very high scratch resistance (gloss retention), particularly suitable for cars.

U.S. Pat. No. 5,426,142 relates to the preparation of water-based polymers, said polymers containing reactive functional groups, and being utilized as coatings for wood, glass, metals, stone materials, said coatings having improved properties of durability, toughness, solvents-resistance, dirt pick-up-resistance, graffiti resistance. The compositions are obtained by mixing a polymer containing acetoacetate functional groups with an aminosilane, crosslinking occurs by hydrolysis and subsequent crosslinking at room temperature. The preparation of the formulation must be such as to utilize controlled amounts of aminosilane, at the most stoichiometric amounts, to avoid premature crosslinkings.

Said compositions show stability so that they can be utilized as a single package.

The drawback of these polymers resides in that they show poor chemical and photooxidative resistance.

In PCT patent WO 90/06958 compositions of polyurethanes containing silicone chains showing release properties of the dirt and easy removal of the residues having a sea origin and having also anti-graffiti properties, are described.

In U.S. Pat. No. 4,781,987 coatings obtained by crosslinking of polyols with melamines having scratch resistance and antigraffiti characteristics, are described. However the composition has the drawback not to crosslink at room temperature.

Other kinds of antigraffiti coatings based on silicones or silicates are known in the prior art. Another type of anti-graffiti coating known in the art is formed by a combination of silicones or silicates with paraffins. However, generally, these coatings not only are difficult to apply, but are not persistent (it being necessary to repeat the treatment whenever the graffito is removed).

U.S. Pat. No. 4,758,622 describes a composition for anti-graffiti coatings comprising at least an aromatic polyisocyanate, at least an aliphatic polyisocyanate and a solvent. The drawback is that the coating changes appearance since it discolours over the time. Therefore said products are not suitable for outside applications.

The utilization of fluoropolyethers-based paints as anti-graffiti is known in the prior art. EP 695772 describes the use of solvent systems based on polymers formed by a fluorinated part having a perfluoropolyethereal structure and by an hydrogenated part having an hydroxylic functionality. The resulting polymer contains from 4 to 6 hydroxylic functionalities crosslinkable with polyisocyanates. European patent application No. 665253 in the name of the Applicant describes the use of solventless systems constituted by fluorinated polymers based on fluoropolyethers comprising a fluorinated part and optionally an hydrogenated part. These polymers contain at least two hydroxylic functional groups and are crosslinkable with polyisocyanates.

Although the results obtained with these compositions are very good from a point of view of the easiness of the graffiti removal, said compositions reach the final anti-graffiti properties in a rather long time, of the order of at least 8 hours. If during this time the treated surface is not protected, a possible graffi to made on the still fresh surface cannot be removed any more.

There is therefore the need to have available a product capable of reaching the final properties in very short times, thus not requiring to be protected by physical barriers after application.

The use of fluorinated polyisocyanates having high functionality is known in the prior art (U.S. Pat. No. 4,863,986 and U.S. Pat. No. 4,704,420). These polymers crosslink by reaction with the atmospheric humidity (moisture curing) and show high viscosity which assures, after the solvent evaporation, a good adhesion to the substratum. However the achievement of the final properties of the film requires very long times, being bound to the attainment of a sufficient crosslinking degree of the film.

The Applicant has unexpectedly found that resins formed by fluorinated building blocks having an isocyanic polyfunctional termination, used alone or in different combinations with fluorinated and/or hydrogenated compounds with hydroxylic functionality in a wide range of molar ratios with respect to the polyfunctional isocyanate, give rise to a range of polymeric films for coatings with different characteristics (as specified hereinafter). each with specific (unknown in the art) combinations of performances both as final characteristics of the coating and as advantages in the application technology, being specifically the anti-graffiti property combined with the tact that said property is reached in short times, generally comprised between 30 min. and 3 hrs, preferably 30 min. and 2 hrs.

The present invention relates to the use for protective coatings having high gloss, DOT (definition of image) and stain release and no dirt pick-up, of compositions comprising (% by weight):

A) from 10 to 60% of a A1) (per)fluoropolyethereal prepolymer having a polyisocyanic functionality obtainable by reacting a bifunctional, optionally polyfunctional (per)fluoropolyether, having hydroxylic functionality, optionally in admixture with monofunctional (per)fluoropolyethers, said fluoropolyethers having —$CH_2OH$ terminations directly linked to a perfluoroalkylic group $CF_2$ or $CF_2CFX$ (X=Cl, F) or $CF(CF_3)$, optionally through a bridging linking group $(CH_2CH_2O)_{c0}$, wherein $_{c0}$ is an integer between 0 and 6, preferably 0–2, with a polyisocyanate containing isocyanurate rings, preferably obtained by cyclotrimerization of HDI, IPDI or other monomeric diisocyanates, by utilizing an excess of isocyanate groups defined by NCO/OH equivalent ratio comprised between 10 and 2, preferably 5 and 2.5;

the above fluoropolyether prepolymer can be partially or totally replaced by A2) non fluorinated polyisocyanates containing isocyanurate rings and/or hydrogenated polyisocyanate prepolymers;

B) from 0.1 to 50% of a (per)fluoropolyether having bifunctional hydroxylic functionality of the type —CF$_2$CH$_2$OH, —CF$_2$CFXCH$_2$OH (X=Cl, F) or —CF(CF$_3$)CH$_2$OH; or polyfunctional hydroxylic functionality termination but containing at least 5% by weight, preferably 10%, of the same type of termination indicated above for the bifunctional, in admixture with of mono- or polyfunctional perfluoropolyethers having an hydroxylic termination, optionally in admixture with diols and/or hydrogenated polyols having a low molecular weight, preferably trimethylolpropane, polycaprolactone triol; or (per)fluoropolyethers prepolymers as defined in A) but having a lower prepolymerization degree so to leave free oxydrilyic functions of the type —CF$_2$CH$_2$OH, —CF$_2$CFXCH$_2$OH (X=Cl, F), or —CF(CF$_3$)CH$_2$OH; or the latter prepolymers having free hydroxilic functions can be used alone as a single component, being component A) 0%;

C) 10–90%, preferably 15–50%, with respect to the resin of a diluting solvent, preferably, belonging to the classes: ketones, esters, heteroalcohols esters, aromatic, and more preferably cycloaliphatic and aliphatic hydrocarbons.

The so obtained polymers, applied on the substrate, are crosslinked with various technologies.

BRIEF DESCRIPTION OF THE DRAWINGS

FIGS. 1A, 1B, 2A, 2B–3B show the XPS spectra of the polymeric Film of SX.26.

Figure 1A:
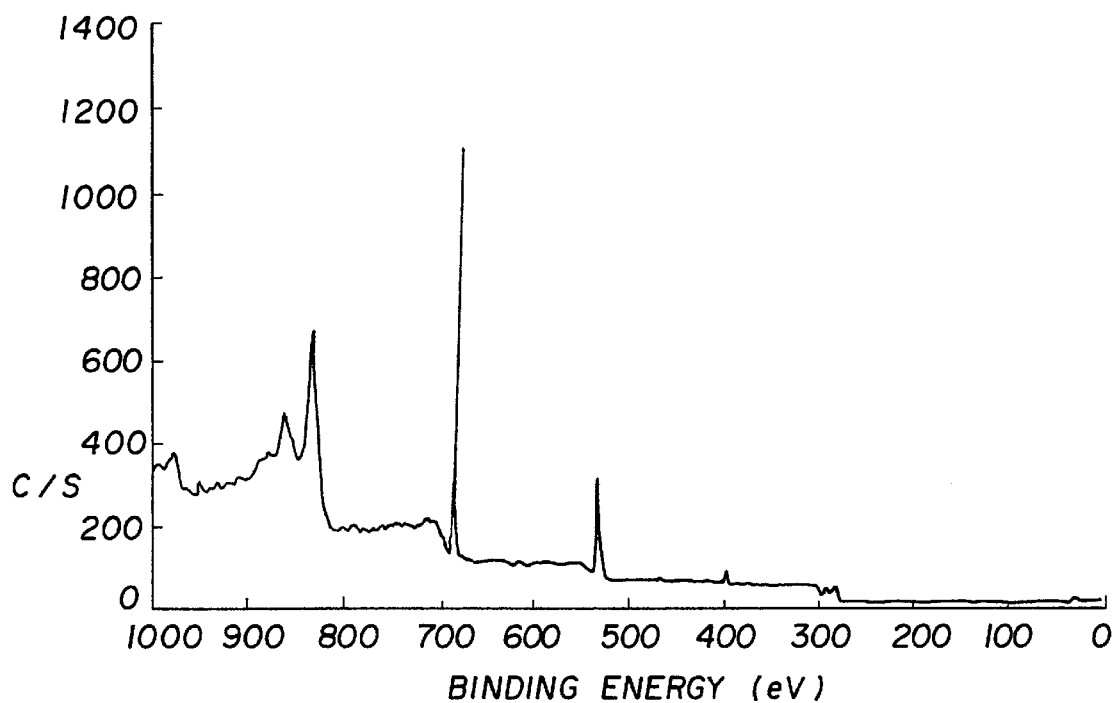

The bifunctional perfluoropolyethers in A), comprise as repeating units sequences of one or more oxyfluoroalkylenic units of the type —CF$_2$CF$_2$O—, —CR$_4$R$_5$CF$_2$CF$_2$O— wherein R$_4$ and R$_5$ equal to or different from each other are chosen from H, Cl or perfluoroalkyl from 1 to 4 carbon atoms, —CF$_2$CF(CF$_3$)O—, —CFYO—, wherein Y is equal to F or CF$_3$. In particular the utilizable perfluoropolyethers generally have a molecular weight number average from 500 to 5000, more preferably from 600 to 1500, still more preferably from 700 to 1300.

Preferably the (per)fluoropolyethers comprise as repeating units sequences belonging to the following classes:

a) —(C$_3$F$_6$O)$_{m'}$(CFYO)$_{n'}$— wherein the unit (C$_3$F$_6$O) and (CFYO) are perfluorooxyalkylenic units statistically distributed along the chain; m' and n' are integers such as to give the molecular weight indicated above, and m'/n' is comprised between 5 and 40, when n' is different from 0; Y is equal to F or CF$_3$; n' can also be 0; said units inside the fluoropolyoxyalkylenic chain optionally can be linked each other by a bridging linking group —O—R'$_f$—O—, wherein R'$_f$ has the meaning defined in c);

b) (C$_2$F$_4$O)$_{p'}$(CFYO)$_{q'}$—(C$_3$F$_6$O)$_{t'}$— whereen p' and q' are integers such that p'/q' ranges between 5 and 0.3, preferably 2.7–0.5, and such that the molecular weight is that indicated above; t' being an integer with the meaning of m', Y=F or CF$_3$; t' can be 0 and q'/q'+p'+t' lower than or equal to 1/10 and the t'/p' ratio is from 0.2 to 6;

c) —CR$_4$R$_5$CF$_2$CF$_2$O— wherein R$_4$ and R$_5$ are equal to or different from each other and chosen from H, Cl or perfluoroalkyl, for instance with 1–C atoms, the molecular weight being that indicated above, said unit inside the fluoropolyoxyalkylenic chain being linked each other as follows:

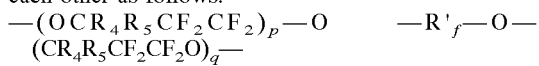

wherein R'$_f$ is fluoroalkylenic group, for instance from 1 to 4 C atoms, p and q are integers from 0 to 200, and p+q is at least 1 and such that the molecular weight is that indicated above;

d) —CF(CF$_3$)CF$_2$O—
said units being linked each other inside the fluoropolyoxyalkylenic chain as follows:

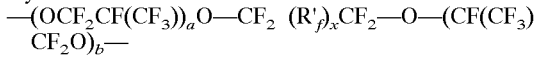

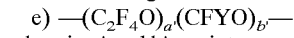

wherein R'$_f$ has the meaning indicated above, x is 0 or 1, a and b are integers and a+b is at least 1 and such that the molecular weight is that indicated above;

e) —(C$_2$F$_4$O)$_{a'}$(CFYO)$_{b'}$—
wherein a' and b' are integers such that the molecular weight is within the range indicated, a'/b' ranges between 5 and 0.3, preferably between 4.5 and 0.5, more preferably between 2.7 and 0.5, Y has the meaning indicated above.

The indicated (per)fluoropolyethers are obtainable with the known processes of the art, for instance U.S. Pat. Nos. 3,665,041, 2,242,218, 3,715,378, and the European patent EP 0239123. The functionalized (per)fluoropolyethers with hydroxylic termination are obtained for instance according to European patent EP 0148482, U.S. Pat. No. 3,810,874.

The preferred compounds are those of the class e) having the general formula:

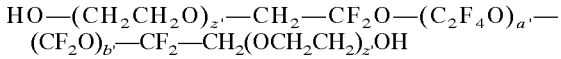

wherein z' is generally comprised from 0 to 20, preferably from 0 to 4.

The preferred B) compound is that with z'=0 (Z DOL).

The above indicated mono-, bi-, polyfunctional hydroxylic terminated perfluoropolyethers can also be partially substituted generally also up to 50% by weight, preferably 20% by weight, with perfluorocarbons containing units chosen from the following: —(CF$_2$CF$_2$)—, —(CF$_2$CFX)— wherein X is F, Cl or a perfluoroalkyl from 1 to 4 carbon atoms or OR'$_f$ wherein R'$_f$ is a perfluoroalkyl from 1 to 4 carbon atoms.

These hydroxylated compounds can be prepared according to methods well known in the art, for instance according to Italian patent applications 19779A/86, 19780A/86, European patent EP 247614, starting from alfa-omega diiodo (per)fluoroalkanes, for instance I(CF$_2$CF$_2$)$_n$I, wherein n indicates the number of repeating units, in order to obtain by the processes indicated therein the terminations —CH$_2$OH, linked to a group —CF$_2$— or —CF(CF$_3$)—.

In practice one telomerizes in radicalic reaction conditions the (per)fluoroolefins TFE and/or fluorinated alphaolefins and/or fluorinated vinylethers, whose units have been indicated above, with iodine as initiator to obtain α, ω diiodoperfluoroalkylenes. From these precursors with known reactions and described in the art, for instance reaction with SO$_3$ and further hydrolysis to obtain the COOH group and moreover esterification to obtain the corresponding diester, for instance methylic diester —CF$_2$COOCH$_3$, which can be reduced with NaBH$_4$ to the corresponding alcoholic group —CH$_2$OH in alpha to the perfluoroalkylic structure.

An alternative route of synthesis consists in dehydroiodination of the —CH$_2$CH$_2$I terminal in basic ambient to —CH=CH$_2$, subsequent oxidative demolition to —COOH and then the above indicated route is followed.

When this class of fluorinated diols is employed, the molecular weight of these components must be lower, preferably about the half with respect to that of the perfluoropolyethers mentioned above, preferably when X is F. The other terminations indicated above for perfluoropolyethers can be obtained by following the methods mentioned in the prior art cited above.

The fluorinated polyhydroxylic compounds having the perfluoropolyethereal structure, can be prepared according to known methods in the art starting from perfluoropolyethers having epoxy groups pending from the main chain (see U.S. Pat. No. 4,853,097) and successive thermal isomerization to obtain acylfluorides COF (see U.S. Pat. No. 5,104,911), which can be easily esterified to give the corresponding methylic ester COOCH$_3$, and subsequent reduction with NaBH$_4$ to obtain the corresponding alcohol CH$_2$OH.

The fluorinated polyhydroxylic compound can be prepared also by base-catalysed reaction of Z DOL with glycidol (see ex. 22), provided that some free CH$_2$OH linked to CF$_2$ of the original Z DOL are deliberately left unconverted.

The formulations in which B) is lower than 15%, crosslink with the environmental humidity in times depending on the air humidity percentage, on the temperature and on the reactivity of the isocyanic chemical species, but which are however contained in the range between 1 and 24 hours. Said times refer to the complete crosslinking of the surface substrate, analytically identifiable by the disappearance of the NCO funtionality. In addition, surprisingly, the isocyanic polyfunctional of A), employed in formulations for protective coatings, shows a behaviour usually provided only by urethanic formulations of the prior art based on high Tg hydrogenated components (hardeners) measured as midpoint (at least 50° C. higher compared with the fluorinated homologue of the present invention. With the formulations of the invention the tack-free time is surprisingly reduced, down to about 20 minutes, also at very reduced crosslinking values, by prevailing effect of evaporation of the solvent. Tests carried out by the Applicant have shown that, for instance, by utilizing IPDI (isophorondiisocyanate trimer) in admixture with HDI (examethylene diisocyanate trimer) have unexpectedly shown very short tack-free times, also at low temperatures, e.g. below 10° C. Also final performances, such as the anti-graffiti function, is unexpectedly assured in times lower than $\frac{1}{10}$ with respect to the time required for the final crosslinking. The isocyanic polyfunctional of A) combines therefore, in an original way, some application performances of high Tg hydrogenated polyurethanes without the inconveniences of the high Tg, that is with some of the performances typical of those having a much lower Tg, like the perfect continuity of the protective film, the flexibility (non brittleness), applicable at low temperature in field.

The coatings crosslinked with environmental humidity (hygrohardeners or moisture curing) show also good stain release characteristics by cleaning with solvents (antigraffiti), comparable with those obtainable by the fluorinated coatings of the prior art and superior to those of the hydrogenated coatings.

In addition, it has been surprisingly found that by adding the fluorinated B) to the prepolymer mentioned in A) of hygrohardening type, antistaticity and stain release properties are obtained. According to our interpretation of the matter, however not binding for the results obtained in the present invention, this property is achieved through the migration of B) to the interphase surface of the coating with the air.

The fluorinated product of B), added even in small amounts (from 0.1 to 10% by weight, preferably from 0.5 to 5%), brings the stain release properties to levels never reached in the prior art. As a matter of fact the no dirt pick-up property is unexpectedly high (see the tables in the examples). And, more important, this characteristic is surprisingly maintained all along the useful life of the coating even after deterioration of the coating by ageing.

Preferably the maximum of the stain release properties is obtained when the component B) is utilized under the form of prepolymer having free hydroxylic functions, as defined above in B).

The mass addition of the hydroxylic polyether cited in B), in ratios next to the stoichiometry between NCO and OH groups, implies the adoption of classic crosslinking methodologies of polyaddition to give urethane bonds. Coating resins of this kind are known in the art and in applications as bicomponents, that is the hydroxylic part and the isocyanic part are separately kept to maintain the integrity during storage (shelf-life) for times compatible with industrial times (some months), and put together in contact just before the utilization. Once they are mixed they must however maintain unaltered some characteristics (for instance the viscosity) for some time (pot-life of the order of some hours) to allow the manageability of the application operation of the formulation on a support. It is clear that a bi-component requires a more complex handling and therefore higher processing industrial costs, including the environmental costs for the disposal of the altered unused product.

The hydroxylic fluorinated product of B) where the function is of the type —CH$_2$OH linked to —CF$_2$, —CF$_2$CFX or —CF(CF$_3$)—, shows peculiar negligible reactivity at room temperature towards free isocyanates. This peculiar foundamental behaviour of CH$_2$OH linked to —CF$_2$, or —CF$_2$CFX, or —CF(CF$_3$) provides a leap in the shelf-life of the isocyanate functionalized prepolymer (partially containing free OH) indicated in B from hours to months, otherwise theoretically conceivable with CH$_2$OH linked to groups different from CF$_2$ and yet in reality non available because of isocyanate and OH self condensation reactions.

It allows also the combination of A+B in a single pack, moisture curable, formulation with a shelf-life of months and still containing the appropriate amount of free OH groups, necessary to provide the stain release property.

It allows the preparation of the prepolymer of A, not fully prepolymerized (some mole k of free OH generally 2% to 50%, preferably 3–10%); of course with the same set of properties described for A+B.

The use of small amount of "quasi latent" catalyst (active at high temperature only), for stance DABCOb® T9; Sn (II) 2-ethylhexanoate or DABCOb® 131 Sn (IV) bisdibutyl bisisooctyltioacetate; for the preparation of the prepolymer B, it helps maximizing the shelf life of the free hydroxylic groups.

The addition of very small amounts of inhibitors of the prior art, generally not higher than 0.4% by weight (for instance benzoyl chloride, acetic acid) secures storage stability up to 50–60° C. However inhibitors in very small amounts, by large tolerated by the subsequent crosslinking, are acceptable but not strictly necessary. These small amounts of inhibitor are easily recoverable with small amounts of catalysts of the prior art without essential alterations of the crosslinking conditions and of the final characteristics. A preferred inhibitor is for example DIAC (difunctional perfluoropolyether having —CF$_2$—COOH terminals), which can be removed by addition of a catalyst consisting of a mixture of tertiary amine and Sn salt, for instance triethylamine and dibutyltindilaurate.

The peculiar behaviour of CH$_2$OH linked to CF$_2$, CF(CF$_3$), CFX, is fully exploited by the bicomponent compositions described in the present invention, which are therefore performable with the shelf-life advantages, bringing it to a "quasi monocomponent" system. The final characteristics (see tables in the examples) both mechanical and chemical resistance, and durability, are those achievable from a bi-component class resin of the present invention, obviously including the stain-release and no dirt pick-up characteristics, though less apparent, already described above for hygrohardeners containing reduced amounts of hydroxylic fluorinated product and/or prepolymer, of B).

More reactive isocyanates (for instance those containing NCO groups on primary carbon, for instance HDI) are to be preferred to obtain a good set of characteristics.

The application of coatings obtainable with the bi-component described above can be carried out also with a high dry formulation (solvent-less), containing a very reduced amount of solvent, generally in the range of about 20%; this represents an advantage from the environmental and regulatory point of view.

The hydroxylic fluorinated product mentioned in B) remarkably reduces the polyisocyanate viscosity so that it is sufficient to utilize spraying devices, usually available, with preheating or deposition devices with heated rollers, generally already at temperatures of 60° C. to fall within the viscosities required by the application techniques. The very low Tg of the fluorinated components of the present invention allows, in addition, the perfect formation of the polymeric film also on cold supports.

In both the crosslinking techniques (hygrohardening and bicomponent urethane), a catalyst is added (only at the time of the use for the urethanic crosslinking).

The chemical classes of catalysts are well known, the metal or aminic ones usually utilized in the formulation of paints can be cited, for instance: tertiary amines such as triethylendiamine, N-ethyl-ethylendiamine, tetramethylguanidine, dimethyl cyclohexylamine, etc.; organometallic catalysts such as dibutyltindilaurate, tin octoate, cobalt naphthenate, vanadium acetylacetonate, dimethyl-tin-diethylhexanoate, dibutyl-tin diacetate, dibutyltin dichloride, dibutyltinbis(isooctyl) tiocetate and mixtures thereof.

The catalyst is added in concentrations generally ranging from 0.1 to 2% by weight and preferably from 0.5 to 1%, except for the bi-component with inhibitor, where the percentage is increased (generally the lower limit is about 0.1%), to compensate the inhibitor effect.

The diluting solvents generally utilizable are those widely employed in the paints industry such as: ketones, esters, heteroalcohols, esters, aromatic, aliphatic and cycloaliphatic hydrocarbons. Methylethylketone (MEK), methylisobutylketone, (MIBK), ethyl or butyl acetate (ButAc), cellosolve acetate, propylenglycolmethylether acetate (PMA), xylol, cyclopentane or cyclohexane, mixtures of aromatic solvents (for instance Solvesso®) are preferred. The most preferred solvent is Solvesso®.

In order to increase the composition pot-life it is preferable that the solvents are urethane grade, i.e. with a content in water lower than 100 ppm to avoid gelling of the system sensitive to moisture.

Additives such as pigments and fillers can be added to the moisture curing and bi-component formulations, provided that are suitably treated to eliminate the residual moisture (heating in an oven at 100–120° C. for a sufficient time to eliminate the moisture (about 15 hours).

Particularly in the case of the silica, when flatting appearance of the coating is desired to be incorporated in minimum amounts to avoid worsening (brittleness) of the mechanical characteristics, the silane pretreated silica of the art result ineffective.

The pigments can be chosen among the natural, synthetic, inorganic and organic ones. As inorganic pigments can be cited: metal oxides (titanium dioxide, iron oxides, mixed oxides of Ni, Co, Zn, Ti, or Cr, Cu or Fe, Ni, Cr, Mn, cobalt aluminates); organic pigments (anthraquinone, quinacridone, tetrachloroisoindolinone, diketoperylene, phthalocyanines derivatives, etc.).

The fillers as well as inert pigments and any other type of additive, are added to the dispersion in very fine form, generally with sizes lower than 100 microns, preferably lower than 10 μm, in amounts up to 15% by volume.

Other examples of fillers are: polyamides of sizes 20–100 microns, glass spheres such as zeolites, etc.

The Applicant has surprisingly found that the addition of fillers and/or pigments to the (per)fluoropolyethers resins of the present invention gives reinforcing effects due to their high interaction and wetting power, over the original clear system. Mechanical properties (hardness, scratch and abrasion resistance, bending and impact resistance) are increased, nevertheless maintaining, surprisingly, very low vapour permeability similar to the unfilled resins. Permeability of pigmented material is very important in applications as anticorrosion where high protection from chemical pollution is required (see the examples below) and pigmentation is required as well.

Other additives which can be added are thixotropic agents, acrylic, silicone, polyurethane, polyaminic, carboxylic, non ionic polymeric dispersants; spreading, anticissing, antifoaming additives, etc.; additives to reduce photooxidation (UV adsorber for instance derivatives of hydroxybenzophenones, hydroxybenzotriazol, etc.) and HALS (hindered amines, for instance tetramethyl-piperidine derivatives, etc.).

The fluorinated resins of the present invention can preferably be spray, roll and aerosol applied. Aerosol is prepared by starting from the resin as such, or pigmented or opacified, diluted with solvents, optionally formulated with the usual additives utilized in the formulation of paints, added with a propellant and put in a can under pressure.

The obtained system has a low content in solid and low viscosity and is sprayed through the valve at a pressure between 2 and 8 atm so as to obtain uniform fine dispersed areosol and, consequently, homogeneous and low thickness films.

For the aerosol application it is preferable to utilize a mixture of solvents.

The combination of the solvents is important since it is necessary to have a solvent mixture having high and low evaporation rate. The former must evaporate very quickly at the time of the application to favour the nebulization and avoid the coating build-up and dripping, while the latter must allow the spreading of the applied film.

The propellant must have a good solvent power for the formulation. Propellants usually employed are (chloro)(fluoro)hydrocarbons such as methylene chloride, most common HFC and HCFC; hydrocarbons such as butane or GPL; ethers such as dimethylether; mixtures of these compounds can also be used.

The percentage of the added propellant is preferably comprised between 15 and 70% by weight with respect to the weight of the formulation and more preferably between 30 and 60% by weight.

The pigments and the flatting agents used in aerosols are the same as those utilized in the other formulations. It is necessary that they are very well dispersed or redisperseable by simple can agitation.

Specific additives, having the function of reducing the residual moisture, i.e. moisture scavengers such as zeolites, anhydrous aluminium sulphates, etc. may be added to facilitate handling and to improve shelf life.

The addition of molecular sieves as inert filler in the can, in addition, contribute in eliminating or in reducing the amount of residual water in the formulation.

The final pressure of the system ranges between 6 and 15 atm.

Typical aerosol packages (cans) can be used, wherein the propellant pressure forces the liquid through the supply valve. The pressure release from the container at high pressure to the ambient provides the conditions for the liquid atomization.

Both tinned band cans and aluminum cans can be used; in the two cases, respectively, pressurization uo to about 7–8 atm and 15 atm respectively can be applied.

In the case of strongly catalyzed systems, it could be necessary to maintain the components separated. For these specific cases aerosol, systems composed by two concentric vessels are known. The mixing of the two solutions occurs just before application, only.

As already mentioned above, the coatings of the present invention find application for protective and aesthetic (high gloss and high imagine definition (DOI)) coatings in architectural building, in infrastructures, in particular in building, as coatings of various substrates, for the peculiar antigraffiti and stain-release properties, combined with the properties indicated above.

With the formulations of the present invention hygrohardening coatings are obtained, modified and not modified with hydrogenated hydroxylic compounds, pigmented or non pigmented with gloss ranging from high to nihil.

The examples report the characterization of cured coating.

As already previously indicated, the hygrohardeners of the present invention are applicable with the established painting techniques, that is spray, roll and aerosol techniques, including the pressurized cans. The relevant formulations are illustrated in the examples.

The exceptional characteristics of stain release, according to an interpretation, though not binding, might be due to the presence of —CFYCH$_2$OH and groups of B), wherein Y=F, Cl, or CF$_3$, indicated hereinafter by —CF$_2$CH$_2$OH (see the tables in the examples). The presence of OH functions of the fluorinated compound at the interphase surface with air is reasonably inferred by data obtained with various techniques.

Analytical techniques, such as XPS, which gives the concentration profile of F, C, O, N in the bulk and in the first layer of about 10–15 Å, shows a significant compositions variation, particularly meaningful for the decrease of nitrogen at the surface, clearly under the stoichiometry, and a fluorine increase at the surface with respect to the bulk.

The OH of the fluorinated compound are also inferable by surface resistance measurements. These values, $10^{10}$–$10^{12}$ Ωcm, are at least two order of magnitude lower than the values known, for instance, for hydrogenated polyurethanes (PU) >$10^{12}$. These data could be explained by the presence of OH at the surface.

Other indirect evidence comes from dynamic contact angle measurements with water by immersion, where rather than the absolute value of the angle, always affected by problems of surface impurities, an unusual effect of progressive "surface wetting" is noticed, which is typical of fluoropolymers with chemically etched surface.

The initial contact angle value is progressively decreased by passing from a value of around 119 to a value of around 109. The initial and final values of course depend on the compositions. However the above decrease of the contact angle is always detectable.

The above mentioned techniques lead, altogether, to confirm the presence of free OH at the surface. However this interpretation is not limitative of the apparent stain release and no dirt pick-up properties obtained with the compositions of the present invention.

The absence of OH of this type in the film bulk, evidenced by IR technique, leads reasonably to suppose that the hydroxyl terminated fluorinated block tend to migrate to the surface, due to its "surfactant-like" characteristics. The retention of the selfcleaning effect of the surface, also after severe ageing conditions (QUV) of the coating, leads also to suppose, without thereby be bound to any mechanism, that the hydroxy terminated fluoropolyether is structured at the surface at the time of the formation of the film: in other words, this means that one end of the component B) is chemically linked to the polycondensation network, while the other end of B) —CF$_2$CH$_2$OH function is free at the surface, and it cannot be washed off from the surface.

As to the retention of the stain-release and no dirt pick-up properties, it is necessary to notice that the fluorinate hydroxyl OH results moreover particularly stable at the photooxidative insult. Tests of high UV degradation of the single components of the composition of the invention show this.

The stain release and no dirt pick-up properties are retained after ageing. More than 600 hrs of QUV exposure, by far sufficient to "destroy" whatever ionic impurity or antisthatic additive of the prior art at the surface, does not alter the stain release and no dirt pick-up properties.

As to the peculiar effectiveness of the —OH function of the invention at the surface, finally it is necessary to notice that the high "acidity" of the hydroxylic H on a carbon which has a CF$_2$ group in alpha position, assures that organic products, degraded partially oxygenated organic products, metals and metal oxides are removed very easily from the surface, for instance by simple washing with water without the use of solvents.

In other words, it would seem from the experimental evidence that it is not sufficient to have the presence of a fluorocarbon chain at the surface to obtain the outstanding stain release and no-dirt pick up characteeristics, but it is necessary that on the fluorinated chain a proper chemical function for the release is attached (for partial "wettability"), and that the fluorinated chain be stably connected to the network of the underlying polymeric film.

The easy cleaning, durability, resistance to the chemical agents and to stains, as well as the simplicity in the use, provided by the composition of the invention, can find also development in the wood protection field.

For the surprising characteristics of short tack-free time combined with the low Tg, as previously said, the hygrohardener of the present invention provides the performances indicated in the comparative tables also when it is applied in—field under severe temperature conditions (low temperatures). It is ideal, therefore, for infrastructures protection in hostile environments such as sea platforms for oil drilling, bridge structures in marine environment.

The coating integrity and continuity, also applied in these unfavourable conditions, assures a high protection degree against the chemical agents at the level usually obtainable only under much more favourable conditions (see performances described in the tables).

The bicomponent coatings of the present invention find application in the protection of metal and polymeric substrates.

A further object of the present invention resides in that as to the application for car protection, the combination of the characteristics is quite satisfactory. The utilization of the bicomponent of the present invention as solventless top-coat with very high performances, protecting a water born pigmented base poor in chemical resistance, outlines a car painting cycle already in line with proximate and future regulations on VOC, provisionally set forth by the European Community.

Sole exception with respect to the required performance profile, the gloss retention in the particularly demanding "brushing" test (low notch stress but repeated many times) peculiar to the car industry.

Also the formulations of the present invention based on polyisocyanates having a higher Tg, give coatings with gloss variation of 30% (request lower than 10%). On the other hand, the use of monomeric and polymeric melamines (e.g. Cymel® 303 and 325) as hardner/cross-linker does not materialize the expected performance. This is caused by the poor reactivity (transetherification) found by the applicant in the application conditions, of the ether functionals of the melamine towards the fluorinate hydroxyl mentioned in B), of the type —$CF_2CH_2OH$.

It has been found by the Applicant the possibility to substantially improve the performance at the "brushing" tests, through the modification of the hard phase via the addition of melamine in suitable conditions. Indeed by prereacting the monomeric melamine with an hydrogenated hydroxylic bifunctional, for instance alkylic glycols, e.g., ethylene glycol it can be mentioned ethylenic glycol, in such conditions as to let free hydroxylic groups (equivalent weight in the range of 60–250), and subsequent reaction of the free hydroxyls with isocyanic polyfunctionals also of type A), the desired performance is improved, obtained (still below the target, but very close) without significant worsening of the remainder of the performance and application profile of the bicomponent coating of the present invention.

It has further been found that, for the car application if one uses resins crosslinked via melamine-type only, i.e. melamine and the hydroxylated polyfunctional cited in B), for instance fluorinated tetraol, as defined under B), a coating having never obtained in the art scratch resistance (gloss variation: 2–3%) is obtained, but with the drawback of worse chemical resistance and durability (weather resistance) in respect to the bicomponent resin of the invention. It has been surprisingly found by the Applicant that if one adds to the above formulation the prepolymer cited in A) and/or B) blocked with blocking agents of the NCO group, for instance with diisopropylamines, methyethylketoximes, pyrazole, also these two properties (chemical resistance and durability) are obtained. This is due to the fact that a mixed network urethane/melamine is obtained which allows to retain these two properties.

In view of the car top-coat application, this second alternative leads to the combination of the cited properties to the excellence: chemical resistance, weather resistance and scratch resistance, together with antigraffiti, no dirt pick-up and easy cleaning.

A further object of the invention resides in that the polyisocyanic fluorinated cited in A) of the present invention, suitably blocked for instance with blocking agents, such as diisopropylamine, pyrazoles, methylethylketoxime, diethylic malonate, etc., allow to overcome the technologic barrier of the in line touch-up of the final product defects. On the industrial lines, indeed, the bodies already painted and finished (pigmented base and top coat already crosslinkled in oven) are subjected to quality control of the painted product. The defects are eliminated with a touch-up (reapplication of the whole cycle, i.e. of the pigmented base and of the top coat on the zone showing the defect, without sanding the whole car) directly in line. The pigmented base, consisting of water resins of the prior art, does not spread and does not adhere on the crosslinked fluorinated top coat.

The blocked fluorinated polyisocyanates indicated above are surprisingly compatible with the usual formulations of the pigmented bases, also when added at high concentrations. Added to the pigmented bases from 1% to 30%, preferably from 5 to 15%, allow at the same time the spreading of the pigmented base on the fluorinated top coat, the wet on wet spreading of the successive layer of fluorinated top coat, the perfect adhesion (due to the the isocyanic groups deblocking) among the various layers after oven crosslinking.

It is deemed, without this being limitative of the disclosed inventive fact, that the suitable blocked fluorinated structure with an isocyanic function of the present invention is capable, although it is compatible with the pigmented base, of migrating in the application conditions to the interphases with air and with the fluorinated resin, bringing there local compatibility (spreading) and reactive groups (crosslinking).

The following examples are given for illustrative purposes and are not limitative of the scope of the present invention.

EXAMPLES 1A AND 1

EXAMPLE 1A

Synthesis of MC Resin from isophorone diisocyanate cyclic trimer

In a 200 l vessel equipped with mechanical stirring, thermometer, refluxing column and nitrogen inlet, 34.48 Kg of Vestanat® T1890 (cyclic trimer of isophorone diisocyanate, Huels) and 40 Kg of anhydrous butyl acetate (water 100 ppm) are charged and dissolved, under stirring and nitrogen atmosphere, at +70° C. Then, 24.76 Kg of ZDOL (equivalent weight 458) are added and the reaction mixture, kept under stirring until the temperature is constant at +70° C. Now, 7 g of dibutyl tin dilaurate dissolved in 50 ml of anhydrous butyl acetate are added. The reaction mixture becomes limpid within 5 minutes with low hexotermicity (+5° C.). Heating continues for other 6 hours, then the resin solution is poured in a tank.

EXAMPLE 1

Preparation of the Formulation

A formulation based on a fluorinated polymer, obtained by the reaction between the fluorinated diol ZDOL having an equivalent weight (PE) 458 and hydroxylic functionality 1.98 and isocyanurate from IPDI Vestanat® T 1890/100 (HULS), having final equivalent weight 1200 was prepared, by operating with an excess of isocyanate groups equal to 60%. The composition of the formulation is described in Table 1.

TABLE 1

|  | g | % by weight |
|---|---|---|
| Fluorinated polymer (60% solution by weight) | 33.3 | 20 |
| DBTDL/DABCO = 1/1 10% in N-MePY | 2 | 0.2 |
| UV adsorber TINUVIN 1130 and 292 50% | 1.2 | 0.6 |
| ButAc | 5.7 | |

TABLE 1-continued

|  | g | % by weight |
|---|---|---|
| EtAc | 40.0 | |
| PMA | 17.8 | |
|  | 100 | 20.8 |

DBTDL = dibutyltindilaurate
DABCO = diazobicyclooctane
ButAc = butylacetate
EtAc = ethylacetate
PMA = propyleneglycol methylether acetate.

The solvents were treated with molecular sieves up to a residual content of water of about 70 ppm.

100 g of formulation were introduced in a 200 ml aluminium vessel.

The vessel was sealed by hand by utilizing an equipment Coster with a Coster valve model K1RA3/3/25 (hole VPH).

A bomb of MEFOREX® 134a was connected to the valve to feed 100 g of propellant.

As supply valve the mod. Coster VO4.1302 was chosen.

EXAMPLES 2A and 2

EXAMPLE 2A

Synthesis of MC Resin from hexamethylenediisocyanate cyclic trimer

In a 200 l vessel equipped with mechanical stirring, thermometer, refluxing column and nitrogen inlet, 24.76 Kg of perfluoropolyether diol are charged having hydroxy equivalent weight 458, together with 35.24 of Tolonate HDT (cyclic trimer of hexamethylenediisocyanate, Rhone Poulenc) and 40 Kg of anhydrous butyl acetate (water 100 ppm).

The reaction mixture is kept under stirring and nitrogen atmosphere and the temperature is raised until +105° C., obtaining a milky phase. Then 7 g of dibutyl tin dilaurate dissolved in 50 ml of butyl acetate are added in 2 minutes: the reaction mixture becomes completely limpid and transparent with hexothermic reaction. Heating continues for 2 hours, then the resin solution having NCO equivalent weight 785 and viscosity 180 cP at 20° C., is poured in a tank.

EXAMPLE 2

Preparation of a Formulation

A formulation based on a mixture of fluorinated polymers was prepared, which were obtained by mixing the fluorinated polymers of Example 1A and 2A in weight ratio 75/25; the data are reported in Table 2.

TABLE 2

|  | g | % by weight |
|---|---|---|
| Mixture of fluorinated polymers (60% solution by weight) | 33.3 | 20 |
| DBTDL 10% in ButAc | 2 | 0.2 |
| UV adsorber TINUVIN 1130 and 292 50% | 1.2 | 0.6 |
| ButAc | 5.7 | |

TABLE 2-continued

|  | g | % by weight |
|---|---|---|
| EtAc | 40.0 | |
| PMA | 17.8 | |
|  | 100 | 20.8 |

The solvents were treated with molecular sieves up to a residual content of water of about 70 ppm.

100 g of formulation were introduced in a 200 ml aluminium vessel.

The vessel was sealed by hand by utilizing a Coster equipment with a Coster valve model KIRA3/3/25 (hole VPH).

A bomb of MEFOREX 134a was connected to the valve to feed 100 g of propellant.

As supply valve, the mod. Coster VO4.1302 was chosen.

EXAMPLE 3

Preparation of a Formulation with butane 150 ml of the formulation of example 2 were introduced in a 200 ml aluminium vessel.

The vessel was sealed by hand by utilizing a Coster equipment with a Coster valve model K1RA3/3/2S (hole VPH).

A bomb of MEFOREX 134a was connected to the valve by feeding 37.5 g of propellant.

As supply valve, mod. Coster VO4.1302 was chosen.

Characterization of Films of the Formulations of Examples 1. 2 and 3

The formulations of examples 1, 2 and 3 applied on supports of chromate aluminium type Q-PANEL A136 previously degreased and cleaned with toluene and acetone gave the following characteristics:

|  | Example 1 | Examples 2 and 3 |
|---|---|---|
| Thickness (ASTM D1005) | 25–30 micron | 25–30 micron |
| Tack-free time (min) | 20 | 30 |

After the tack-free time of the test the surfaces were stained with solvent acrylic spray paints (Dupli Color) of black and red colour, nitro paints (Color matic) of red and green colour, solvent fluorescent paints (Dupli Color Fluo), water acrylic paints (Dupli Color Aqua Lack) of black colour, metallized paints (Dupli Color Eloxal) all produced by Vogelsang (Cesano Boscone, Milano) and with indelible Stabilo marking pens of different colours with a fine tip, black Staedtler marking pens with a thick tip and rechargeable Marker marking pens. The graffiti cleanness was then evaluated every 10 min by utilizing paper soaked in ethanol. The antigraffiti properties are reached after 2 hours from the tack-free time for Examples 1–3.

EXAMPLE 4A

Example 1 (Table 1) has been repeated but by using 19% by weight of fluorinated prepolymer and 1% by weight of Z-DOL. The formulation has been characterized as in Example 1 and showed the same tack-free time.

EXAMPLE 4 (COMPARATIVE)

Preparation of Formulation from ZMC 2000
(According to U.S. Pat. No. 4704420)

A formulation based on a fluorinated polymer was prepared, obtained by the reaction of ZDOL 2000 (number average molecular weight 2000) with IPDI, then with TMP and then IPDI, the molar ratio where Z-DOL=1; IPDI=2, then TMP=2, then IPDI=4. It was obtained a resin with PE (equivalent weight) 3800 and isocyanic content NCO 2.6 as described in Table 3.

TABLE 3

|  | g | % by weight |
|---|---|---|
| Fluorinated polymer | 31.5 | 19.6 |
| DBTDL/DABCO = 1/1 10% in N-MePY | 3.8 | 0.4 |
| UV adsorber TINUVIN 1130 and 292 50% | 1.2 | 0.6 |
| ButAc | 15.2 |  |
| EtAc | 32.8 |  |
| PMA | 16.4 |  |
|  | 100 | 20.6 |

The solvents were treated with molecular sieves up to a residual content of water of about 70 ppm.

100 g of formulation were introduced in a 200 ml aluminium vessel.

The vessel was sealed by hand by utilizing a Coster equipment with a Coster valve model K1RA3/3/25 (hole VPH).

A can of MEFOREX 134a was connected to the valve to feed 100 g of propellant.

As supply-valve the mod. Coster VO4.1302 was chosen.

Characterization of the Film of Example 4

The formulation of example 4 was applied on supports of chromate aluminium type Q-PANEL A136 and crosslinked at 60° C./2 hours.

On chromate aluminium it gave the following properties:
Thickness (micron) 25–30
Tack-free time (min) 30

After reaching the tack-free time, the surfaces of the tests were stained with indelible Stabilo marking pens of different colours with a fine tip, black Staedtler marking pens with a thick tip and rechargeable Marker marking pens. The graffiti cleanness was then evaluated by utilizing paper soaked in ethanol. The antigraffiti properties are reached after about 20 hours.

EXAMPLE 5

Preparation of a Bicomponent Formulation from IPDI

A composition was prepared containing 26.4 parts by weight of fluorinate compound ZDOL having an equivalent weight 458, functionality 1.9, 69.0 parts of prepolymer obtained by reaction between Z DOL and isocyanurate from IPDI VESTANAT T 1890/100 (HULS), having final equivalent weight 1200 and isocyanic functionality NCO 3.5, 0.5 parts of catalysts DBTDL (Fluka, 25% in PMA), 4.0 parts of mixture of UV stabilizers Tinuvin 1130/Tinuvin 2922/1 (Ciba) having 50% by weight in PMA. The solid percentage of the formulation is 67% by wt.

Application of the Bicomponent Formulation

The formulation of Example 5 was spray applied by gun, (Sata Jet) nozzle 1.2, at a pressure of 3 bar on chromate aluminium Q-Panel type. The formulation was crosslinked 1 hour at 90° C.

TABLE 4

CHARACTERIZATION OF THE FILM OF EXAMPLE 5

| TEST | RULES | RESULT |
|---|---|---|
| MEK | AICC N 12 | 100 |
| ADHESION | ASTM D3359-87 | 100 |
| KOH-I-NOOR PENCIL HARDNESS | NCCA II-12 | F |
| IMPACT TEST | AICC N 12 | 54/56 |
| T BEND | AICC N 23 | OT |
| TANGENTIAL MODULUS E | ASTM D 1708 | 570 MPa |
| YIELD $\sigma_y$ | " | 18 MPa |
| YIELD ELONGATION $\epsilon_y$ | " | 6–7% |
| STRESS AT BREAK $\sigma_R$ | " | 16.3 MPa |
| ELONGATION AT BREAK $\epsilon_R$ | " | 90–100% |
| TABER | ASTM D 4060 | 30 mg/kcycles |
| Film Tg (hydrogenated part) |  | 50–60° C. |
| Tg (fluorinated part) |  | −80/−90° C. |

EXAMPLE 6

Preparation of a Monocomponent Formulation from HDI

A composition was prepared containing 91.0 parts by weight of fluorinated resin obtained by reaction between Z DOL and isocyanurate from HDI Desmodur 3300 (Bayer), having final equivalent weight 790 and isocyanic functionality NCO 5.3, 5.5 parts by weight of a catalyst mixture DABCO/DBTDL (Fluka, 10% in PMA), 3.5 parts of UV stabilizer mixture Tinuvin 1130/Tinuvin 292 2/1 (Ciba) with 50% by weight in PMA. The solid percentage of the formulation is 55% by weight; the remaining part being the solvent in ratio by weight 30/70 butyl acetate/solvesso.

EXAMPLE 7

Preparation of a Monocomponent Formulation from IPDI

A composition was prepared containing 91.0 parts by weight of fluorinated resin obtained by reaction among Z DOL and isocyanurate from IPDI Vestanat 1980/100 (Huls), having final equivalent weight 1200 and isocyanic functionality NCO 3.5, 5.5 parts by weight of catalyst mixture DABCO/DBTDL (Fluka, 10% in PMA), 3.5 parts of mixture of UV stabilizers Tinuvin 1130/Tinuvin 292 2/1 (Ciba) with 50% by weight in PMA. The solid percentage of the formulation is 55% by weight; the remaining part being the solvent in ratio by weight 30/70 butyl acetate/Solvesso.

The formulations of examples 6 and 7 were applied on supports of chromate aluminium Q-Panel type as in Example 1 and after standing at room temperature for 15' were crosslinked in oven at 60° C. for 24 hours in conditions of 100% relative moisture (example 6) or at the temperature of 23° C., 60% relative moisture for 30 days (example 7) in order to allow the complete crosslinking by following the disappearance of the NCO band by IR. The characteristics of the obtained films are reported in Table 5.

TABLE 5

CHARACTERIZATION OF THE FILMS OF EXAMPLES 6 AND 7

| TEST | Example 6 | Example 7 |
|---|---|---|
| MEK | 100 | 100 |
| ADHESION | 100 | 100 |
| (KOH-I-NOOR) PENCIL HARDNESS | F | H |
| IMPACT TEST | 55/55 | 20/15 |
| SALINE FOG (NCCA II-2) | 1500 h/OK | 1500 h/OK |
| IMMERSION IN WATER 50° C. | 1000 h/OK | 1000 h/OK |
| TANGENTIAL MODULUS E | 630 MPa | 1750 MPa |
| YIELD POINT $\sigma_y$ | 18 MPa | — |
| YIELD ELONGATION $\epsilon_y$ | 8% | — |
| STRESS AT BREAK $\sigma_R$ | 24 MPa | 46 MPa |
| ELONGATION AT BREAK $\epsilon_R$ | 60% | 3–4% |
| TABER | 15 mg/kcycles | 47 mg/kcycles |
| Tg (hydrogenated part) | 35° C. | 67–170° C. |
| Tg (fluorinated part) | –90° C. | n.d. |

EXAMPLE 8 (COMPARATIVE)

Preparation of a Non Fluorinated Monocomponent Formulation

A formulation was prepared containing 91.0 parts by weight of resin isocyanurate from HDI Desmodur E 3265 (Bayer) having equivalent weight 400 and isocyanic functionality 10.4, 5.5 parts by weight of catalyst DBTDL (Fluka, 25% by weight in PMA), 3.5 parts of UV stabilizer mixture Tinuvin 1130/Tinuvin 2922/1 (Ciba at 50% by weight in PMA). The solid percentage of the formulation is 55%.

The formulation was applied and crosslinked as in Examples 6 and 7.

EXAMPLE 9

Preparation of a Bicomponent Formulation Z DOL/ High Dry Prepolymer MC HDI

A composition was prepared containing 31.4 parts by weight of fluorinated resin Z DOL having equivalent weight 458, functionality 1.9, 69.0 parts of fluorinated resin obtained by reaction between Z DOL and isocyanurate from HDI DESMODUR 3300 (Bayer), having final equivalent weight 633 and isocyanic funcionality NCO 6.6 at 72% by weight in Solvesso 150/PMA (70/30 by weight), 0.5 parts of catalyst DBTDL (Fluka, 25% by weight in PMA), 2.0 parts of UV stabilizer mixture Tinuvin 1130/Tinuvin 2922/1 (Ciba). The percentage of solid of the formulation is 83%.

The formulation was applied as in Example 5.

EXAMPLE 10

Preparation of a Bicomponent Formulation from HDI with Excess of Z DOL

The formulation of example 9 was added with 5 parts by wt. of fluorinated polymer Z DOL and applied as in Example 9.

EXAMPLES 11–12

The formulations of Examples 6, 8, 9 were added with 5 parts by weight of fluorinated polymer Z DOL, applied and crosslinked according to Example 6.

The tests of Examples 6, 8, 9 (examples 11, 12 and 10) were subjected to the soil-release test which consists in the visual evaluation of 10 stains left by water dirted with carbon black after drying at 40° C., removal with cloth of 4 stains, removal of 6 stains with water in ultrasound bath. The results are reported in Table 6.

TABLE 6

| | Cleaning with cloth | Cleaning water + ultrasound bath |
|---|---|---|
| EXAMPLE 6 | HALO | HALO |
| EXAMPLE 11 (ex. 5 + 5% Z DOL) | VERY LIGHT HALO | VERY LIGHT HALO |
| EXAMPLE 9 | LIGHT HALO | LIGHT HALO |
| EXAMPLE 10 (ex. 9 + 5% Z DOL) | VERY LIGHT HALO | VERY LIGHT HALO |
| EXAMPLE 8 comp. | HALO | HALO |
| EXAMPLE 12 (ex. + 5% Z DOL) | VERY LIGHT HALO | VERY LIGHT HALO |

The same samples of the previous test were subjected to the dirty pick-up test according to two methodologies normally utilized by Central Glass Co. Ltd.:

1. immersion of the panels in solution containing water, carbon black and iron dioxide under stirring for 24 hours at room temperature, subsequent cleaning of the laminations under water jet, light passage with blotting paper, visual evaluation of the surface state (accelerated test).
2. External exposure of the panels, artificial dirting of the samples with the solution containing water, carbon black and iron dioxide, visual evaluation of the surface state after the first rain. The results are reported in Table 7.

TABLE 7

| | After immersion of the panels in solution 1) | After external exposure 2) |
|---|---|---|
| EXAMPLE 6 | HALO | HALO |
| EXAMPLE 9 | LIGHT HALO | LIGHT HALO |
| EXAMPLE 10 (ex. 9 + 5% Z DOL) | VERY LIGHT HALO | VERY LIGHT HALO |
| EXAMPLE 8 | HALO | HALO |
| EXAMPLE 12 (ex. 8 + 5% Z DOL) | VERY LIGHT HALO | VERY LIGHT HALO |

EXAMPLE 13

Bicomponent Formulation Added with Hardener (melamine/glycol adduct)

A formulation was prepared containing 21.6 parts by weight of fluorinated compound Z DOL having equivalent weight 458, functionality 1.9; 70.1 parts of fluorinated prepolymer obtained by reaction between Z DOL and iso-cyanurate IPDI Vestarat T 1890/110 (Huls), having final equivalent weight 1200 and isocyanic functionality NCO 3.5, 7.0 parts of catalyst DBTDL (Fluka, 5% by weight in PMA), 1.3 parts of adduct obtained by reaction between melaminic compound Cymel 303 (Dyno-Cyanamid) and the ethylene glycol having hydroxylic equivalent weight 200. The solid percentage of the formulation is 64%.

ESEMPIO 14

Bicomponent Formulation Added with Hardener (melamine/glycol adduct)

A formulation was prepared containing 14.2 parts by weight of fluorinated compound Z DOL having equivalent weight 458, functionality 1.9, 100%; dry, 74.8 parts of fluorinated prepolymer obtained by reaction between Z DOL and isocyanurate IPDI Vestanat T 1890/110 (Huls), having final equivalent weight 1200 and isocyanic funcionality NCO 3.5, 7.5 parts of catalyst DBTDL (Fluka, 5% by weight in PMA), 3.5 parts of adduct obtained by reaction between melaminic compound Cymel 303 (Dyno-Cyanamid) and the ethylene glycol having hydroxylic equivalent weight 200.

The solid percentage of the formulation is 62%.

EXAMPLE 15

Characterization of Examples 13–14

The formulations of examples 13 and 14 were applied at #50 on samples of chromate aluminium Q-PANEL type, prepainted with an original water base coat Alfa Romeo and dried at 60° C. for 1 hour, and crosslinked at 90° C. for 1 hour or 140° C. for 30 minutes.

The following results are obtained.

|  | Ex. 13 at 90° C./ 1 h | Ex. 13 at 140° C./30 min. | Ex. 14 at 90° C./1 h | Ex. 14 at 140° C./30 min. |
|---|---|---|---|---|
| GLOSS (60°) | 70 | 66 | 74 | 67 |
| GLOSS VARIATION AFTER BRUSH (SEPTUM) TEST | 17 | 15 | 15 | 10 |

EXAMPLE 16

On the samples of example 15, the original base-coat ALFA ROMEO is reapplied, additivated with 10% of the prepolyner of Example 7 blocked with diisopropylamine; also the base-coat additivated with 20% of the prepolymer described above is reapplied.

The so obtained samples were dried at 70° C. for one hour. The adhesion of the base-coat on the fluorinated top coat was then evaluated. The results are reported in Table 8.

TABLE 8

|  | BASE COAT NOT ADDITIVATED | BASE COAT + 10% BLOCKED PREPOLYMER | BASE COAT + 20% BLOCKED PREPOLYMER |
|---|---|---|---|
| ADHESION | VERY EVIDENT DEWETTING | OPTIMAL SPREADING AND OPTIMAL ADHESION | OPTIMAL SPREADING AND OPTIMAL ADHESION |

EXAMPLE 17

Preparation of a Formulation for Car Top-coat and Touch-up

A formulation was prepared containing 45.2 parts by weight of the fluorinated resin tetraol (TOL) of B. (The TOL is prepared according to Example 22 below); 24.1 parts by weight of melaminic resin Cymel 325 (Dyno-Cyanamid), 2.6 parts of catalyst PTSA (paratoluensulphonic acid, Fluka 25% in PMA), 7.5 parts by weight of of UV stabilizer mixture Tinuvin 1130/Tinuvin 2922/1 (Ciba at 50% PMA), 20.4 parts by weight of PMA. The content in dry is 70%.

The formulation was spray applied by gun (Sata Jet) nozzle 1.2 at a pressure of 3 bar on original water base-coat Alfa and crosslinked at 140° C. for 30 min. On the so obtained sample the original base-coat ALFA ROMEO is reapplied, additivated with 10% of the prepolymer of Example 7 blocked with diisopropylamine, see Example 16 and also the base-coat added with 20% of the adduct mentioned above is reapplied.

The so obtained samples were dried at 70° C. for one hour. Then the adhesion of the base-coat on the fluorinated top coat was evaluated. The results are reported in Table 8A

TABLE 8A

|  | BASE COAT NOT ADDITIVATED | BASE COAT + 10% PREPOLYMER | BASE COAT + 20% PREPOLYMER |
|---|---|---|---|
| ADHESION | VERY EVIDENT DEWETTING | OPTIMAL SPREADING AND OPTIMAL ADHESION | OPTIMAL SPREADING AND OPTIMAL ADHESION |

TABLE 9

CHARACTERIZATION OF THE FILM OF EXAMPLE 17 NOT ADDITIVATED

| Thickness | 40 μm |
|---|---|
| Adhesion on original base coat | 100% |
| MEK | 100 |
| (Koh-I-Noor) Pencil Hardness | F |
| Gloss (20°) | 71 |
| Gloss variation after brush test* | 1.5–3 |

*the brush test is not a normed test, but it is usually utilized by the PPG laboratories for the quality control. It consists in the dirting of the panel to be examined with soap powder, removal of the dust in excess, by turning over the sample, passage with small brush covered with filter paper for 25 cycles, gloss evaluation on the treated part.

EXAMPLE 18

Preparation of a Bicomponent Formulation

A formulation was prepared containing 30.9 parts by weight of fluorinated resin Z DOL having equivalent weight 458, functionality 1.9; 68.8 parts of fluorinated resin obtained by reaction between Z DOL and isocyanurate from IPDI Vestanat T 1890/100 (Huls), having final equivalent weight 1060 and isocyanic functionality NCO 3.9, 0.3 parts by weight of catalyst DABCO 131 (Allied, 25% in PMA). The solid of the formulation is 77%. The use of an active catalyst only at temperatures higher than 50° C. allows to have an high pot-life, as shown by the progress of the viscosity during the time reported in Table 10.

TABLE 10

|  | Initial Viscosity | Viscosity after 8 hours | Viscosity after 48 hours |
|---|---|---|---|
| 20° C. | 2000 cPs | 2000 cPs | 2000 cPs |
| 50° C. | 330 cPs | 350 cPs | 330 cPs |

EXAMPLE 19

Use of Inhibitors in the Bicomponent Formulation

A formulation was prepared containing 25.2 parts by weight of fluorinated resin Z DOL having equivalent weight 458, functionality 1.9; 55.4 parts of fluorinated resin obtained by rection between Z DOL and isocyanurate from IPDI Vestanat T 1890/100 (Huls), having final equivalent weight 1010 and isocyanic functionality NCO 4.1, 0.1 parts by weight of inhibitor benzoyl chloride (Fluka), 7.7 parts by weight of PMA. The solid percentage of the formulation is 64%. The use of an inhibitor in the formulation allows to have a high shelf life, as reported in Table 11.

TABLE 11

|  | Viscosity initial | Viscosity 1 day | Viscosity 5 days | Viscosity 15 days |
|---|---|---|---|---|
| 23° C. | 600 cPs | 585 | 592 | — |
| 50° C. | 260 cPs | — | 380 cPs | 400 cPs |

EXAMPLE 20

Pigmented Formulation MC from IPDI

The formulation was prepared, containing 53.7 parts by weight of fluorinated resin obtained by reaction between Z DOL and isocyanurate from IPDI Vestanat T 1890/100 (Huls), having final equivalent weight 1200 and isocyanic functionality NCO 3.5, 3.3 parts of catalyst mixture DABCO/DBTDL (Fluka, 10% in PMA), 3.5 parts of stabilizer UV Tinuvin 1130/Tinuvin 292 2/1 (Ciba) with 50% by weight in PMA, 13.8 parts of a PMA butyl acetate mixture, 25.7 parts of titanium dioxide R960 (Du Pont).

The final dry content of the formulation is 60%. The preparation was milled in laboratory mill Red Devil (Red Devil Equipment Co.) for 30 min. (Hegman fineness 6.5), filtered on three layers of 1000 mesh Nylon Monodur net.

EXAMPLE 20A

Example 20 has been repeated but by adding 5% by weight of Z DOL B) with respect to the prepolymer.

EXAMPLE 20B

Example 20 has been repeated but by adding 5% by weight of the prepolymer obtained according to Example 24 below. The properties are the same of Example 20 but with stain release and no dirt pick-up properties.

EXAMPLE 21

Application and Characterization of Example 20

The formulation of Example 20 was applied and crosslinked as in Example 6. The tests so obtained show the properties reported in the Table below.

The weathering resistance is of 2750 hours QUV: 100% Gloss retention Delta E 0.5.

TABLE

| MECHANICAL PROPERTIES | |
|---|---|
| tack-free time | 10 min |
| Adhesion | 100% |
| MEK | 100 |
| (Koh-I-Noor) pencil hardness | H |
| Gloss (60°) | 73 |
| Impact Test | <10/<10 |

EXAMPLE 22

TOL Prepration and Formulation for Car Top-coat

The resin TOL, a polyhydroxy functional perfluoropolyether, was prepared by base-catalyzed addition (T=70° C., catalyst potassium t-butoxide 5% by moles) of Z DOL (1 mole) to glycidol (1.9 moles). The resin has a OH functionality 3.8, equivalent weight (PE) 280.

A formulation has been prepared containing 43.75 parts by weight of the above fluorinated resin TOL; 20.31 parts by weight of melaminic resin Cymel 325 (Dyno-Cyanamid), 14.50 parts by weight of the prepolymer of Example 7 blocked with methyl ethyl ketoxime, 0.31 parts by weight of catalyst DBTDL (Fluka 25% in PMA), 21.13 parts by weight of buthanol. Final dry content is 70%.

Formulation has been applied by spray gun (Sata-Jet) nozzle 1.2, 3 bar pressure onto original Alfa water-basecoat and cured at 140° C./30 min.

EXAMPLE 23

Example 22 panel has been characterized and compared with ex. 17 (not additivated).

Results are reported in the Table below

|  | Ex. 17 not additivated | Ex. 22 |
|---|---|---|
| Thickness (μm) | 40 | 40 |
| Adhesion | 100 | 100 |
| MEK | 100 | 100 |
| Pencil Hardness (Koh-I-Noor) | F | F |
| Gloss 20° | 71 | 62 |
| Gloss variation after brush test | 1.5–3 | 4–8 |
| Chemical resistance evaluation after 6 hours spot test $H_2SO_4$ 10% | light halo | no damage |
| Chemical resistance evaluation after 6 hours spot test $H_3PO_4$ 10% | halo | no damage |
| Stain release test in accordance with exs. 11–12 | no halo | no halo |
| Catabolite resistance | slight halo | no halo |
| QUV resistance: 50% Gloss retention Delta E = 2 | after 2000 hours | after 3000 hours |

EXAMPLE 24

Synthesis of MC Resin from isophorone diisocyanate cyclic trimer

In a 200 l vessel equipped with mechanical stirring, thermometer, refluxing column and nitrogen inlet, 34.48 Kg of Vestanatb® T1890 (cyclic trimer of isophorone diisocyanate, Huels) and 40 Kg of anhydrous butyl acetate (water 100 ppm) are charged and dissolved, under stirring and nitrogen atmosphere, at +70° C. Then, 24.76 Kg of Z DOL (equivalent weight 458) are added and the reaction mixture is kept under stirring until the temperature is constant at +70° C. Then 3.45 g of tin octoate dissolved in 50 ml of butyl acetate anhydrous are added. The reaction mixture becomes limpid within 5 minutes. Heating continues for other 3 hours, then the resin solution, having viscosity 300 cP at 20° C., is poured in a tank.

EXAMPLE 25

Shelf life of Ex. 24 product has been tested by Brookfield viscosity measurements.

|  | Viscosity (cPs, 20° C.) |
|---|---|
| initial | 247 |
| after 5 days | 250 |
| after 10 days | 255 |
| after 30 days | 270 |

EXAMPLE 26

The prepolymer of Example 6 has been added with 5 parts by weight of the prepolymer of Example 24. Panels have been prepared as in Ex. 7 and tested as in Exs. 11–12. Stain release properties have been evaluated in accordance with 10 drop test. The results are the following:

|  | cleaning with clothing | cleaning with ultrasonic bath |
|---|---|---|
| Ex. 26 | no halo | no halo |

Figure 1B:
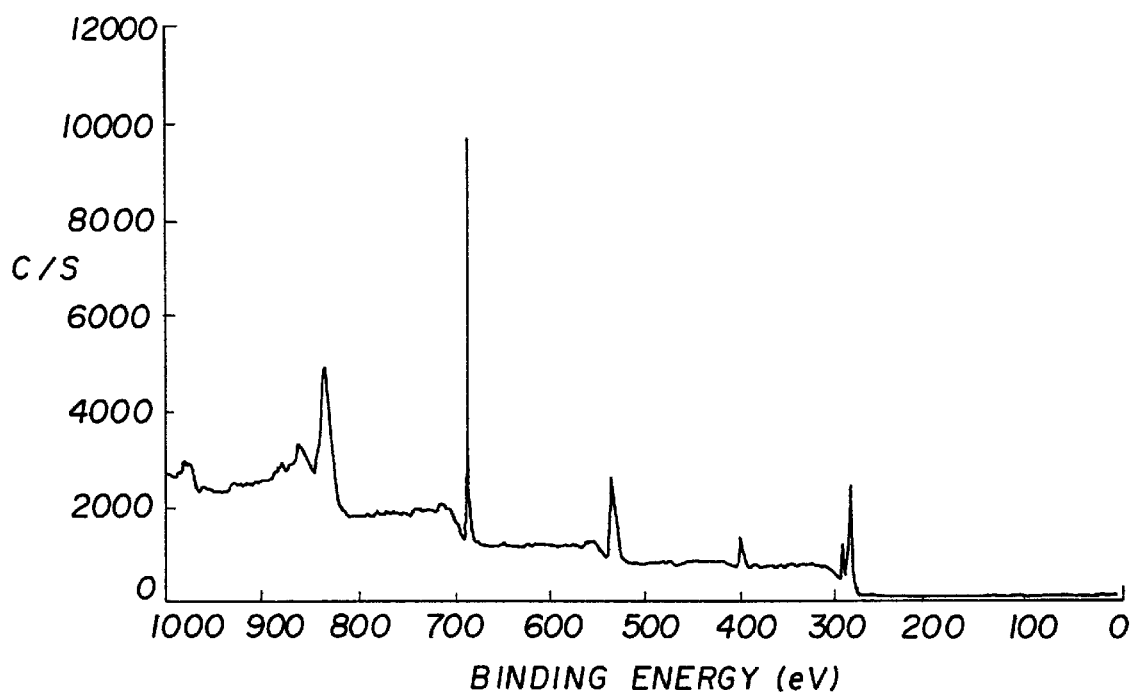
Figure 2A:
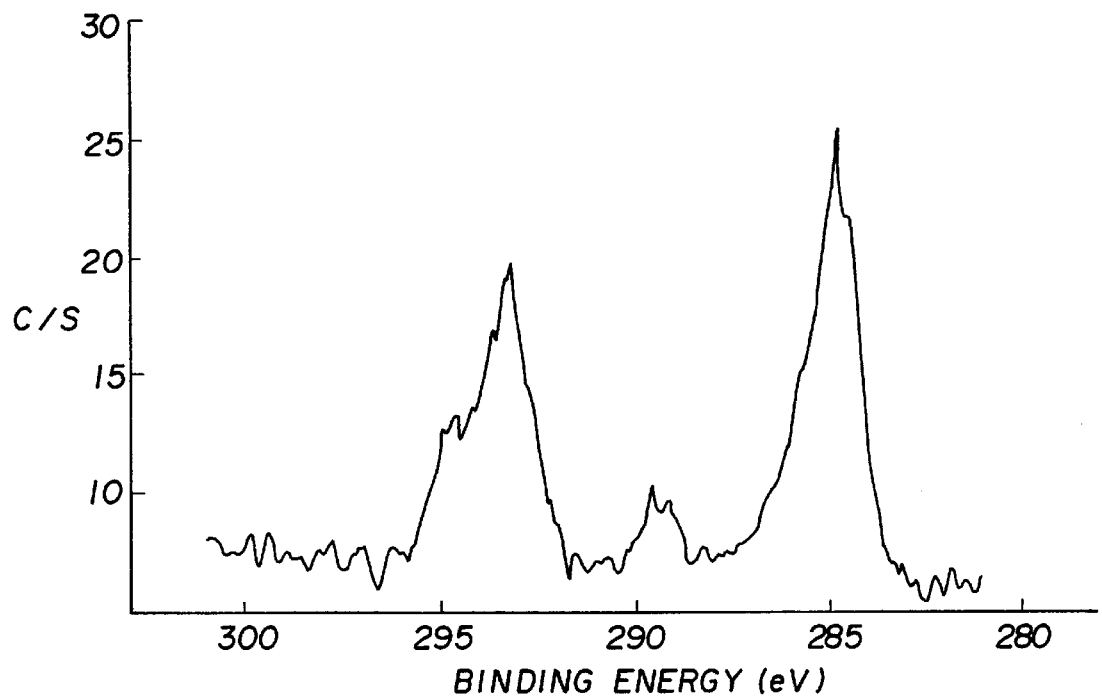
Figure 2B:
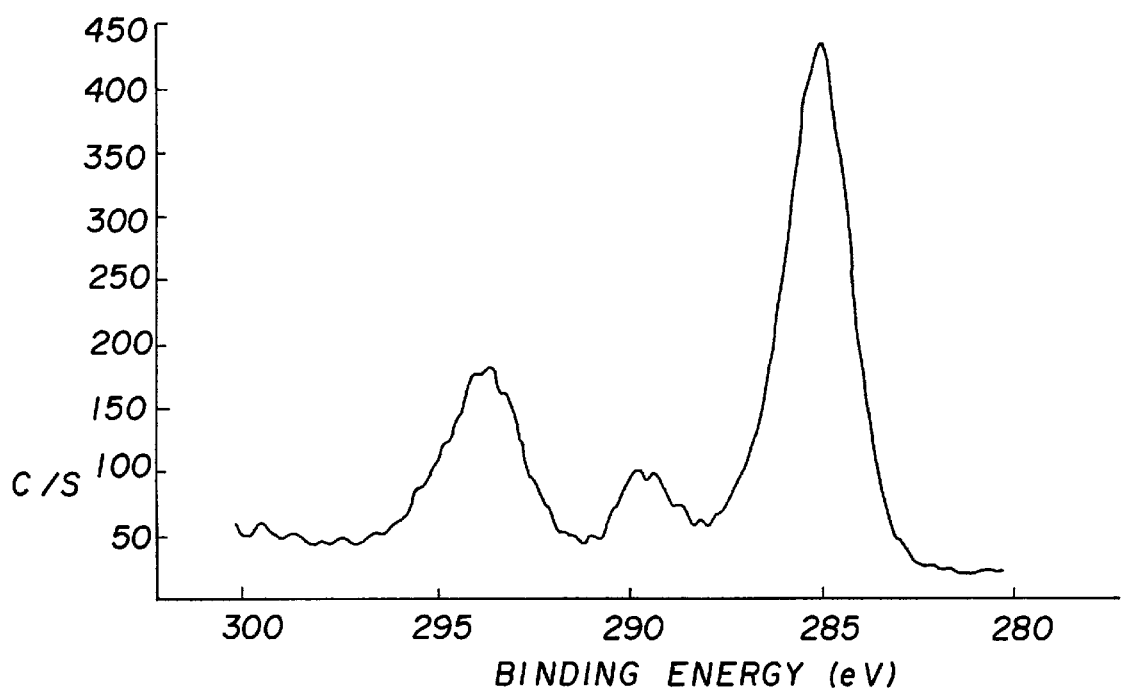
Figure 3A:
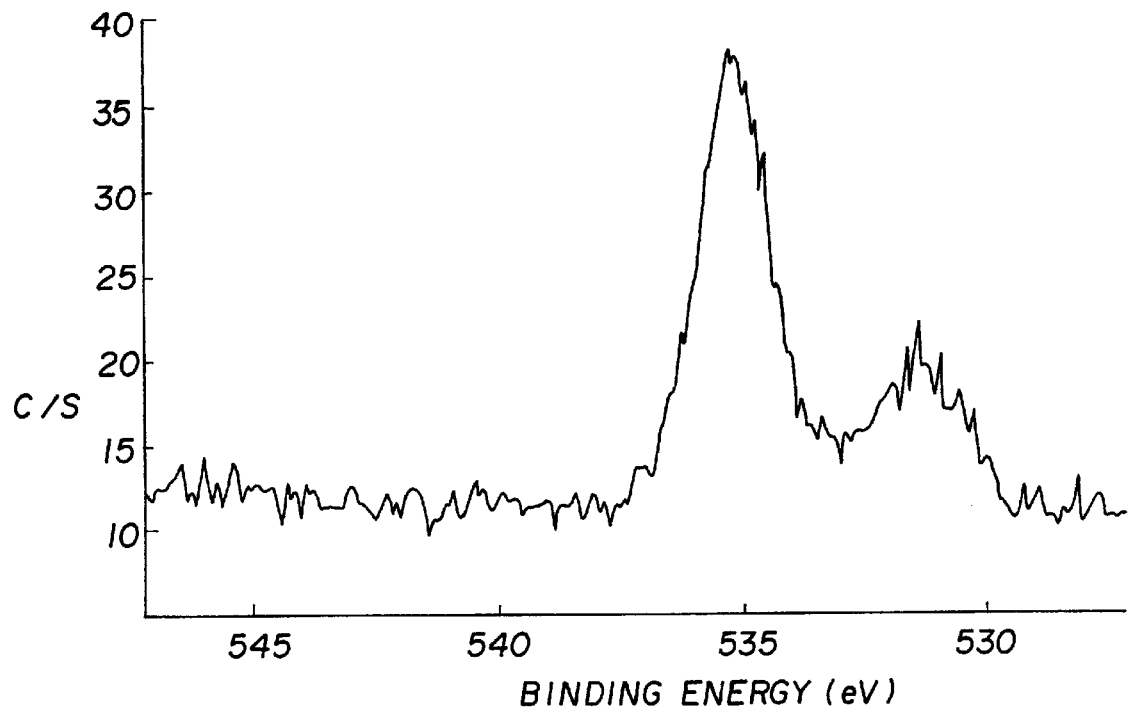
Figure 3B:
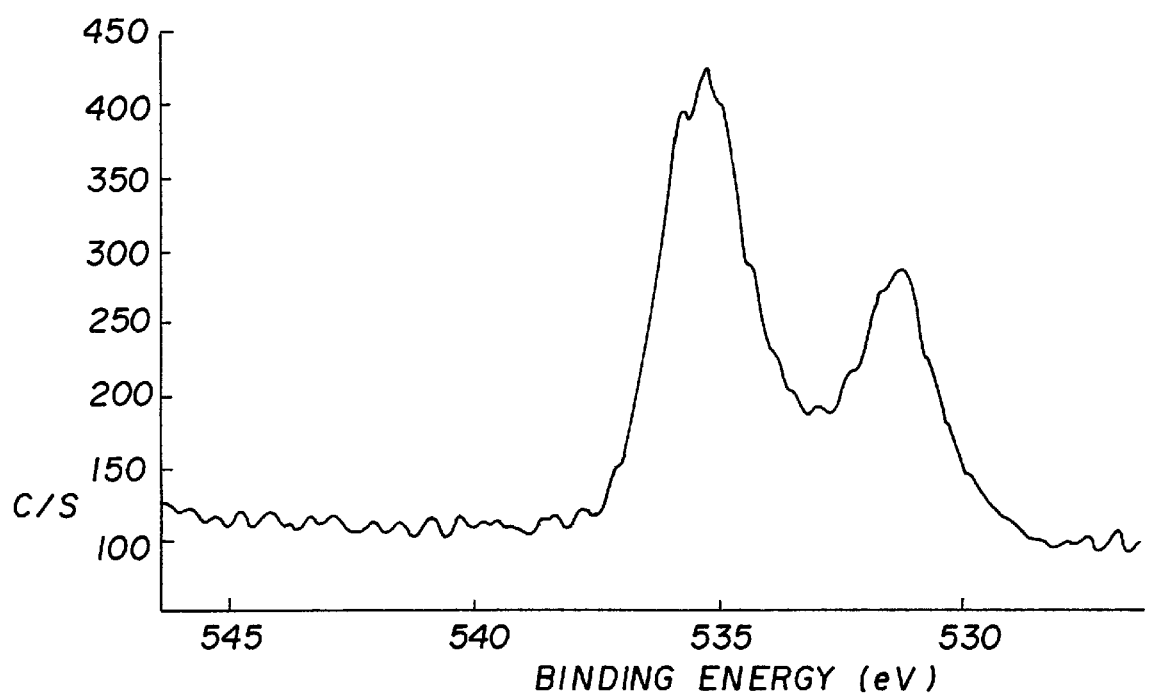

In FIGS. 1, 2a and 2B the XPS spectra of the polymeric film of Ex. 26 are reported. In particular in FIG. 1 it is reported the XPS spectra (A: 10° take-off angle, B: 90° take-off angle, corresponding to sampling depths of about 1–2 nm and 7–10 nm respectively).

Relative abundance of Nitrogen: A=4.3%, B=6.3%, theoretical (bulk)=7.6%;

In FIG. 2A it is reported the XPS spectra in the C1s region (A and B spectra have the meaning indicated in FIG. 1).

The high energy signals at 294–293 eV are due to the perfluoroether chain. The variation of intensity ratios between signals observed (fluorine-non fluorine) further moves the surface composition towards the fluorinated component, beyond what already apparent from survey spectra.

In FIG. 2B it is reported the XPS spectra in the O1s region (A and B spectra have the meaning indicated in FIG. 1).

The high energy signal at 535.5 eV is due to the perfluoroether chain. The variation of intensity ratios between signals observed (fluorine-non fluorine) further moves the surface composition towards the fluorinated component, beyond what already apparent from survey spectra.

EXAMPLE 27

5 parts by weight of Ex. 24 prepolymer have been added to Ex. 5 product. Panels have been prepared as in Ex. 7 and tested as in Exs. 11–12. Stain release properties have been evaluated in accordance with 10 drop test. The results are the following:

|  | cleaning with clothing | cleaning with ultrasonic bath |
|---|---|---|
| Ex. 27 | no halo | no halo |

EXAMPLE 28

5 parts by weight of Ex. 24 prepolymer have been added to Exs. 8 and 9 product. Panels have been prepared as in Ex. 7 and tested as in Exs. 11–12. Stain release properties have been evaluated in accordance with 10 drop test.

The results are the following:

|  | cleaning with clothing | cleaning with ultrasonic bath |
|---|---|---|
| Ex. 8 + 5 parts Ex. 24 | no halo | no halo |
| Ex. 9 + 5 parts Ex. 24 | very slight halo | very slight halo |

EXAMPLE 29

Some panels of Exs. 2, 20 and 20B have been prepared and characterized via vapor permeation giving the following results: ASTM F 1249.

|  | vapour permeation (90% RH, T = 38° C.) g mm/m² 24 h |
|---|---|
| Ex. 2 | 3.46 |
| Ex. 20 | 3.39 |
| Ex. 20B | 3.41 |

EXAMPLE 30

Some panels of Ex. 26 have been ebxposed in accelerating weathering test (QUV) apparatus for 1000 hours and then tested as in Exs. 11–12. The QUV test has been carried out according to ASTM D 2211 and D 253. Scain release properties have been evaluated in accordance with 10 drop test. The results are the following:

|  | cleaning with clothing | cleaning with ultrasonic bath |
|---|---|---|
| Ex. 30 | no halo | no halo |

We claim:

1. A method for coating and protecting materials, substrates and coatings, comprising applying thereto compositions comprising (% by weight):

A) from 10 to 60% of a A1) (per)fluoropolyethereal prepolymer having a polyisocyanic functionality obtained by reacting a bifunctional, optionally polyfunctional (per)fluoropolyether, having hydroxylic functionality, optionally in admixture with monofunctional (per)fluoropolyethers, said fluoropolyethers having —CH$_2$OH terminations directly linked to a perfluoroalkylic group CF$_2$ or CF$_2$CFX (X=Cl, F) or CF(CF$_3$), optionally through a bridging linking group (CH$_2$CH$_2$)$_{co'}$ wherein $_{co}$ is an integer between 0 and 6, with a polyisocyanate:

containing isocyanurate rings, obtained by cyclotrimerization of HDI, IPDI or other monomeric diisocyanates, by utilizing an excess of isocyanate groups comprised between 10 and 80%, the above fluoropolyether prepolymer can be partially or totally replaced by A2) non fluorinated polyisocyanates containing isocyanurate rings and/or hydrogenated polyisoyanate prepolymers;

B) from 0.1 to 50% of a (per)fluoropolyether having bifunctional hydroxylic functionality of the type —CF$_2$CH$_2$OH, —CF$_2$CFXCH$_2$OH (X=Cl, F) or —CF(CF$_3$)CH$_2$OH, or polyfunctional hydroxylic functionality termination but containing at least 5% by weight, of the same type of termination indicated above for the bifunctional in admixture with mono or polyfunctional perfluoropolyethers having an hydroxylic termination, optionally in admixture with diols and/or hydrogenated polyols having a low molecular weight, or (per)fluoropolyethers prepolymers as defined in A) but having a lower prepolymerization degree so as to leave free hydroxylic functions of the type —CF$_2$CH$_2$OH —CF$_2$CFXCH$_2$OH (X=Cl, F), or —CF(CF$_3$)CH$_2$OH; or the latter prepolymers having free hydroxylic functions can be used alone as a single component, being component A) 0%;

C) 10–90%, with respect to the resin of a diluting solvent, preferably, belonging to the classes: ketone, esters, heteroalcohols esters, aromatic, and cycloaliphatic and ailphatic hydrocarbons.

2. The method according to claim 1 wherein the terminations —CH$_2$OH of the (per)fluorinated diols are of the type —CF$_2$CH$_2$OH.

3. The method according to claims 1 wherein the polyisocyanates mentioned in A) are obtained by cyclotrimerization of HDI and/or IPDI.

4. The method according to claim 1 wherein the excess of isocyanate groups is comprised between 20 and 60%.

5. The method according to claim 1, wherein the prepolymer A) of the fluoropolyether is totally substituted by non fluorinated hydrogenated polyisocyanates containing isocyanurate rings and/or polyisocyanate prepolymers.

6. The method according to claim 1 wherein the perfluoropolyethers with hydroxylic terminations comprise as repeating units sequences of one or more oxyfluoroalkylenic units of the type —CF$_2$—CF$_2$O—, —CF$_4$R$_5$CF$_2$CF$_2$O— wherein R$_4$ and R$_5$ equal or different from each other are selected from the group consisting of H, Cl, F and perfluroalkyl from 1 to 4 carbon atoms, —CF$_2$CF(CF$_3$)O—, —CFYO—, wherein Y is equal to F or CF$_3$.

7. The method according to claim 1, wherein the perfluoropolyethers with bifunctional or polyfunctional hydroxylic terminations have number average molecular weight comprised between 500 and 5000.

8. The method according to claim 7 wherein the number average molecular weight is comprised between 700 and 1500.

9. The method according to claim 1, wherein the perfluropolyethers comprise as repeating units sequences belonging to the following classes:

a) —(C$_3$F$_6$O)$_{m'}$(CFYO)$_{n'}$— wherein the unit (C$_3$F$_6$O) and (CFYO) are perfluorooxyalkylenic units statistically distributed along the chain; m' and n' are integers such as to give the molecular weight indicated above, and m'/n' is comprised between 5 and 40, where n' is different from 0; Y is equal to F or CF$_3$;

b) —(C$_2$F$_4$O)$_{p'}$(CFYO)$_{q'}$—(C$_3$F$_6$O)$_{t'}$— wherein p' and q' are integers such that p'/q' ranges between 5 and 0.3, and such that the molecular weight is that indicated above; t' being an integer with the meaning of m', Y=F or CF$_3$; and q'/q'+p'+t' lower than or equal to 1/10 and the t'/p' ratio is from 0.2 to 6;

c) —CR$_4$R$_5$CF$_2$CF$_2$O— wherein R$_4$ and R$_5$ equal to or different from each other and are selected from the group consisting of H, Cl and perfluoroalkyl with 1–4 C atoms, the molecular weight being that indicated above said unit inside the fluoropolyoxyalkylenic chain being optionally lined each other as follows:

—(OCR$_4$R$_5$CF$_2$CF$_2$)$_p$—O—R'$_f$—O(CR$_4$R$_5$CF$_2$CF$_2$O)$_q$— wherein R'$_f$ is fluoroalkylenic group from 1 to 4 C atoms, p and q are integers from 0 to 200, and p+q is at least 1 and such that the molecular weight is that indicated above;

d) —CF(CF$_3$)CF$_2$O— said units being connected to each other inside the fluoropolyxyalkylenic chain as follows:

—(OCF$_2$CF(CF$_3$))$_a$O—CF$_2$(R')$_f$)$_x$CF$_2$—O—(CF(CF$_3$)CF$_2$O)$_b$— wherein R'$_f$ has the meaning indicated above, x is 0 or 1, a and b are integers and a+b is at least 1 such that the molecular weight is that indicated above;

e) —(C$_2$F$_4$O)$_{a'}$(CFYO)$_{b'}$— wherein a' and b' are integers such that the molecular weight is within the range indicated, a'/b' ranges from 5 and 0.3, Y has the meaning indicated above.

10. The method according to claim 9, wherein the perfluoropolyethers having hydroxylic termination have the general formula:

HO—(CH$_2$CH$_2$O)$_{z'}$—CH$_2$—CF$_2$O—(C$_2$F$_4$O)$_{a'}$—(CF$_2$O)$_{b'}$—CF$_2$—CH$_2$(OCH$_2$CH$_2$)$_{z'}$OH wherein z' when present is comprised between 0 and 4.

11. The method according to claim 10 wherein z'=0.

12. The method according to claim 1 wherein the perfluoropolyethers with mono-, bi-, polyfunctional hydroxylic termination can be partially substituted up to 50% by weight by perfluorocarbons containing units selected from the group consisting of —(CF$_2$CF$_2$)—and —(CF$_2$CFX)— wherein X is a perfluoroalkyl from 1 to 4 carbon atoms, Cl or OR" wherein R"$_f$ is a perfluoroalkyl from 1 to 4 carbon atoms.

13. The method according to claim 1 wherein the polyhydroxylic fluorinated compounds indicated in A) having the perfluoropolyethereal structure are prepared starting from perfluoropolyethers having epoxy groups pending from the main chain and subsequent thermal isomerization to obtain the acylfluorides COF, which are esterified to give the corresponding methylic ester COOCH$_3$, and successively reduced with NaBH$_4$ to obtain the corresponding CH$_2$OH alcohol; or by base-catalysed reaction of the bifunctional (per)fluorinated diol with glycidol provided that some free CH$_2$OH linked to —CF$_2$, —CF$_2$CFX (X=Cl, F) or —CF(CF$_3$), of the original bifunctional diol deliberately left unconverted.

14. The method according to claim 1, wherein B) is a prepolymer at low prepolymerization degree having free hydroxylic functions ranging from 2–50% by moles.

15. The method according to claim 14, the coatings showing also good antistaticity, stain-release and no dirt pick-up characteristics.

16. The method according to claim 1 wherein the components A), B) and C) are pre-mixed and utilized as "single package" monocomponent paints.

17. The method according to claim 16 wherein amounts of inhibitors comprised in the range 0.05–0.4% by weight are added.

18. The method according to claim 16 wherein amounts of catalyst between 0.1 and 2% by weight are added.

19. The method according to claim 1 wherein the amount of C) is comprised betweeen 15 and 25% by weight.

20. Use for protective coatings of compositions according to claim 1 wherein C) tis omprised between 60 and 90% by weight, applied by aerosol whercin the propellant ranges between 15 and 70% by weight.

21. The method according to claim 20 wherein additives such as pigments and fillers are added.

22. The method according to claim 21 wherein the additives have sizes lower than 10 μm, and are added in amounts up to 15% by volume.

23. Protective coatings produced by the method according to claim 1.

24. Protective coatings of compositions according to claim 10 wherein z'=0.

25. The method according to claim 15 wherein the polyfunctional fluorinated resin of B), is crosslinked by melamine.

26. The method according to claim 25, wherein the polyfunctional fluorinated resin of B), is crosslined by melamine and the prepolymer of A) and/or B) blocked with blocking agents of the NCO groups to obtain a mixed urethane/melamine network.

27. The method according to claim 14, wherein the fluorinated resin of B) is the prepolymier and is crosslinked by an adduce of melamine with an aliphatic non fluorinated diol.

28. A method of inducing compatibility and adhesion between hydrogenated coatings and fluorinated coatings comprising contacting said coatings with a fluorinated prepolymer obtained by the method of claim 1, and wherein said fluorinated prepolymar has blocked NCO groups.

29. Compatibility agents prepared according to claim 25, wherein NCO groups are blocked.

30. The method according to claim 25 wherein B is tetraol.

31. The method according to claim 26 wherein B is tetraol.

* * * * *